United States Patent
Springfield et al.

(10) Patent No.: US 8,473,747 B2
(45) Date of Patent: Jun. 25, 2013

(54) SECURE BOOT WITH MINIMUM NUMBER OF RE-BOOTS

(75) Inventors: Randall S. Springfield, Chapel Hill, NC (US); Joseph M. Pennisi, Apex, NC (US); Howard Locker, Cary, NC (US); Kenneth S. Seethaler, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 154 days.

(21) Appl. No.: 13/049,050

(22) Filed: Mar. 16, 2011

(65) Prior Publication Data

US 2012/0239917 A1    Sep. 20, 2012

(51) Int. Cl.
*G06F 21/00* (2006.01)

(52) U.S. Cl.
USPC .......................................................... 713/182

(58) Field of Classification Search
None
See application file for complete search history.

(56) References Cited

U.S. PATENT DOCUMENTS

| | | | |
|---|---|---|---|
| 2008/0184035 A1* | 7/2008 | Iyer et al. | 713/183 |
| 2009/0070593 A1* | 3/2009 | Boshra et al. | 713/186 |
| 2009/0319806 A1* | 12/2009 | Smith et al. | 713/193 |
| 2011/0126023 A1* | 5/2011 | Wang et al. | 713/182 |
| 2012/0151223 A1* | 6/2012 | Conde Marques et al. | 713/193 |
| 2012/0159041 A1* | 6/2012 | Saxena et al. | 711/103 |
| 2012/0254602 A1* | 10/2012 | Bhansali et al. | 713/2 |

* cited by examiner

*Primary Examiner* — Cordelia Zecher
(74) *Attorney, Agent, or Firm* — Ference & Associates LLC

(57) ABSTRACT

Systems, methods and products are described that provide secure boot with a minimum number of re-boots. One aspect provides a method including receiving an indication to boot from a power off state at a computing device; responsive to authenticating a user at one or more input devices, releasing a value derived from authenticating the user at the one or more input devices; responsive to releasing the value, unlocking one or more encrypted drives with a previously established alternate credential; and thereafter proceeding to boot from the power off state. By not having to call the non-BIOS software each boot, this minimizes the number of reboots for each boot cycle.

18 Claims, 4 Drawing Sheets

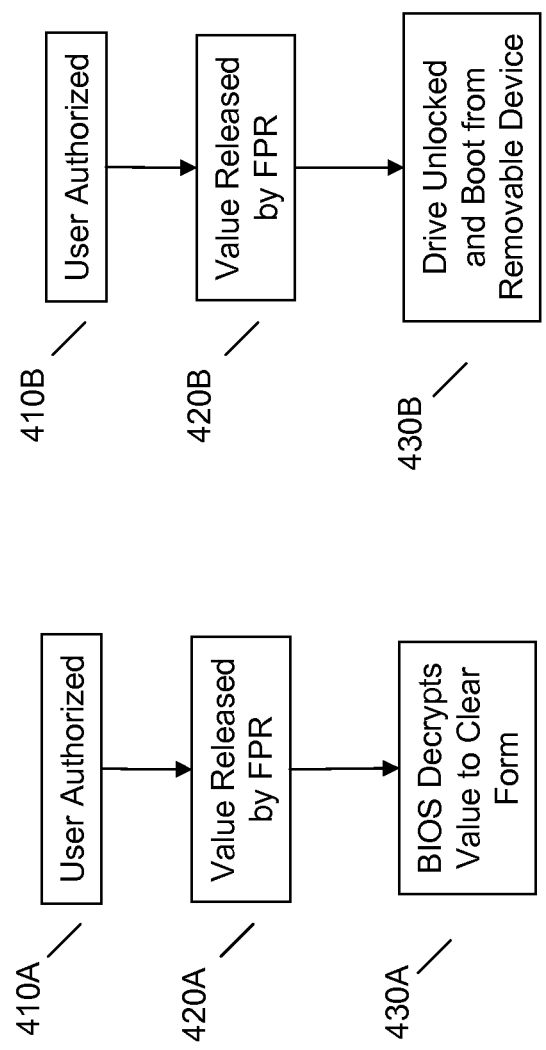

SECURE BOOT WITH MINIMUM NUMBER OF RE-BOOTS

BACKGROUND

Providing security for data in computing systems is important for many reasons, such as ensuring sensitive data is not accessible to unauthorized users. Passwords are commonly used in an attempt to secure computing systems. For example, at power on, a user may be prompted for a password prior to allowing the computing system to complete booting. Users resuming a computing system from a lower powered state, for example S3, may be prompted for a password (for example, a power-on password) prior to the computing system resuming.

With respect to the data content of drives (disks, HDDs), conventionally a password may be set for a drive itself, whereby at power on of a computing system, data of a drive of the computing system is locked, subject to authorization using the password. Thus, access to the drive contents is dependent on authentication. However, with proper equipment, even password locked drives could be removed and the data read without proper authentication. Efforts to make data on drives more secure thus lead to additional schemes, including encrypting the data on the drive so that even though the data on the drive may be accessible if the drive is removed, the data on the drive is not in a useful form (it is encrypted).

A way in which data on a drive may be encrypted is through use of a self-encrypting drive (SED). SEDs are storage devices that include embedded services for encrypting the data content of the drives. The Trusted Computing Group (TCG) specifies a standard, commonly referred to as Opal, for security regarding SEDs. SEDs operate by encrypting data written to the drive, and decrypting encrypted data read from the drive. This is done by the SED and is transparent from the user's perspective. SEDs are locked when powered off, and remain locked on power up until an authentication takes place.

Key management in SEDs is provided in the hard disk controller and authentication on power up of an SED takes place via a software pre-boot authentication environment or with a BIOS password. For example, when a computing system is powered on and requests the master boot record (MBR), the SED returns an MBR shadow, which is pre-boot code for an environment that allows the disk to unlock. The MBR shadow authenticates the user and unlocks the drive, at which point the normal boot process is resumed and the computing system's request for the MBR returns to the actual MBR, the operating system is loaded and the booting process completes. This ensures that in a power off state in which the disk is powered down, the disk protects all data contents on it because the data content, including an operating system (OS), is in an encrypted state and can not be unlocked without proper authentication.

BRIEF SUMMARY

In summary, one aspect provides a method comprising: receiving an indication to boot from a power off state at a computing device; responsive to authenticating a user at one or more input devices, releasing a value derived from authenticating the user at the one or more input devices; responsive to releasing the value, unlocking one or more encrypted drives with a previously established alternate credential; and thereafter proceeding to boot from the power off state.

Another aspect provides a system comprising: one or more processors; one or more encrypted drives; and one or more input devices; wherein, responsive to execution of computer program instructions accessible to the one or more processors, the one or more processors are configured to: receive an indication to boot from a power off state at a computing device; responsive to authenticating a user at one or more input devices, release a value derived from authenticating the user at the one or more input devices; responsive to releasing the value, unlock one or more encrypted drives with a previously established alternate credential; and thereafter proceed to boot from the power off state.

A further aspect provides a computer program product comprising: a computer readable storage medium having computer readable program code embodied therewith, the computer readable program code comprising: computer readable program code configured to receive an indication to boot from a power off state at a computing device; computer readable program code configured to, responsive to authenticating a user at one or more input devices, release a value derived from authenticating the user at the one or more input devices; computer readable program code configured to, responsive to releasing the value, unlock one or more encrypted drives with a previously established alternate credential; and computer readable program code configured to thereafter proceed to boot from the power off state.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4A illustrates an example method for securing a re-boot credential.

FIG. 4B illustrates an example method for secure re-boot from a removable device.

DETAILED DESCRIPTION

Figure 1:
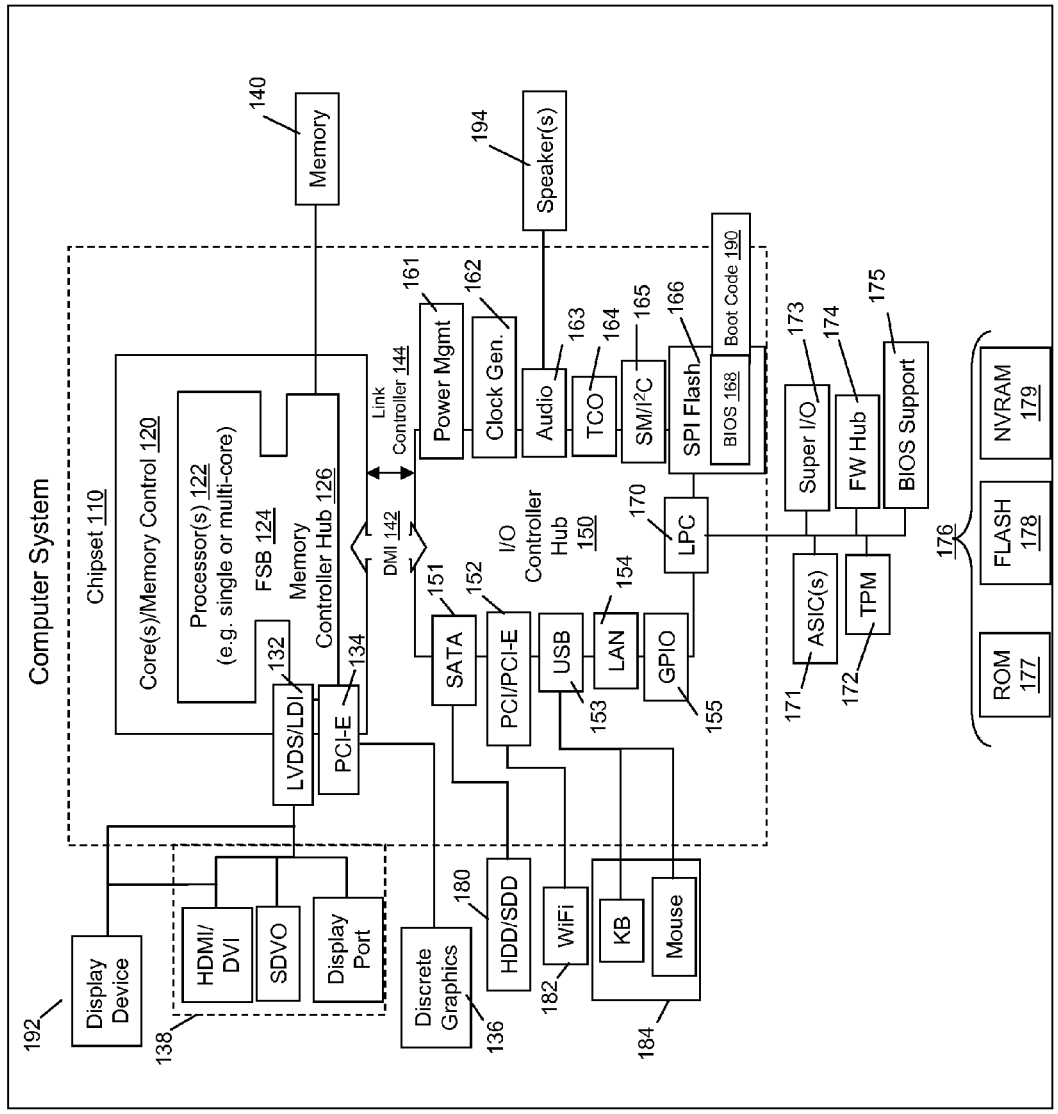
FIG. 1 illustrates an example circuitry of a computer system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

Using a pre-boot authentication environment, as described herein, in which user authentication allows the drive to be unlocked only at power up creates problems for users attempting to boot a device from a suspended state and for users attempting to boot from a "power off state" (S4/hibernation/suspend to disk, S5/off state). This is because running the pre-boot environment is time consuming. Forcing the computing system to run the pre-boot environment each power up adds to boot time and precludes quickly resuming the computer system from a suspended state.

While the TCG is considering a solution (referred to herein as TCG resume solution) to forcing a computing system to run the pre-boot environment, wherein the drive can resume from a suspended state (for example, S3) and accept a credential (to unlock the drive), this solution does not address booting from a power off state. The TCG resume solution involves, during the pre-boot environment (power up), establishing an alternate credential that BIOS can later use to unlock the drive (for example, upon resume from S3 state). Upon resume (for example, from S3 state) the BIOS automatically sends the alternate credential created during the initial pre-boot process to the drive for unlocking the drive. However, the alternate credential is re-established (or a new alternate credential is created) with each boot from a power off state. That is, the pre-boot environment is required to run each time the computing system is booted from a power off state.

Thus, even with such a TCG resume solution, running a pre-boot environment each time a computing system is booted from a power off state is required as a security measure. This unnecessarily adds to boot time.

Accordingly, embodiments provide for secure booting without having to run a pre-boot environment that adds to boot time each time a computing system is booted from a power off state. As an example, an embodiment uses a device to ensure that a user attempting to boot the computing system is an authorized user prior to releasing an established credential for unlocking an encrypted drive. The device outputs a value allowing boot from a power off state.

One embodiment utilizes a biometric device as the device that ensures the user attempting to boot the computing system is an authorized user. As a non-limiting example of such a biometric device, an embodiment using a fingerprint reader (FPR) is described herein. Those having ordinary skill in the art will readily appreciate that other means for authenticating may be employed. For example, other embodiments may utilize a smart card and smart card reader, entry of a password, utilization of voice recognition, utilization of a visual authentication (such as VERIFACE device), utilization of a Trusted Platform Module (TPM), or other means to accomplish this authentication functionality. However, it is worth noting that more complex authentication means may require more memory, which can in some cases be constrained. VERIFACE is a registered trademark of Lenovo (Beijing) Limited Corp. in the United States and other countries.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C. However, as is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
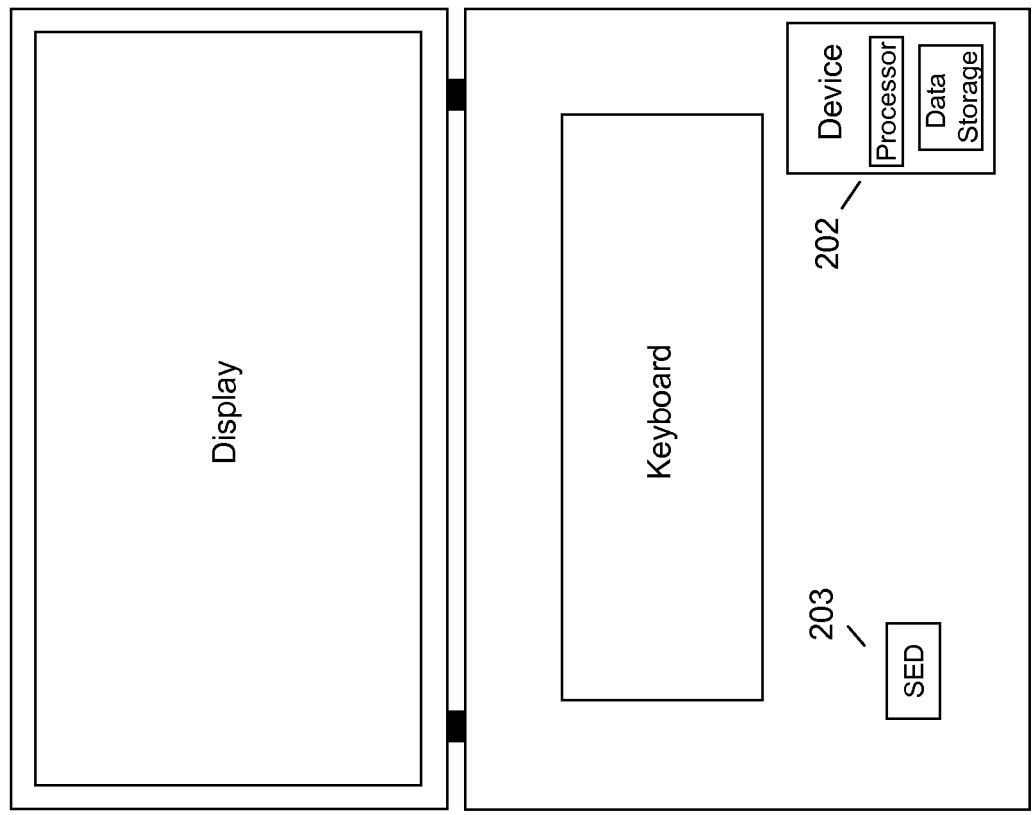
FIG. 2 illustrates an example system for secure re-boot.

FIG. 2 illustrates an example system for authenticating a user prior to allowing booting from a power off state. The system 201 may include components such as those illustrated in FIG. 1, and may include one or more encrypted HDDs, such as a SED 203. The system 201 uses an input device 202

(FPR in this example) to ensure that the user attempting to boot is an authorized user prior to release of a credential for unlocking an encrypted drive. The FPR 202 outputs a value that allows an encrypted drive to be unlocked without running the conventional pre-boot environment at power on. The value may comprise the alternate credential established during an initial pre-boot environment, as discussed herein, or a value that allows a component (for example, BIOS) of the computing system to derive a credential (such as the alternate credential). The FPR may be a sub-system including its own processor and (secure) data storage unit/memory.

In the example case of where a FPR 202 is utilized as the input device, the FPR 202 may indicate that it is ready to accept input. This indication may include for example a light being lit on the FPR 202, which may happen upon a boot from a power off state.

The example system 201 is configured to employ the SED 203. In a first boot-up, the pre-boot environment (including MBR shadowing) authorizes the user and sets up an alternate credential. The alternate credential may be predetermined by the BIOS and communicated to the pre-boot environment, or created by the pre-boot environment and sent to the BIOS, or some other mechanism may be used, so long as an alternate credential is established. Once the initial boot process has completed and an OS loaded, the user may utilize the system 201 as desired. The credential (or alternate credential) may be communicated to the FPR 202 once established or could be stored within the FPR 202 if the credential is predetermined. When the system 201 is placed into a power off state, such as S4 or S5, FPR 202 may be utilized to authenticate the user prior to unlocking the SED 203.

Figure 3:
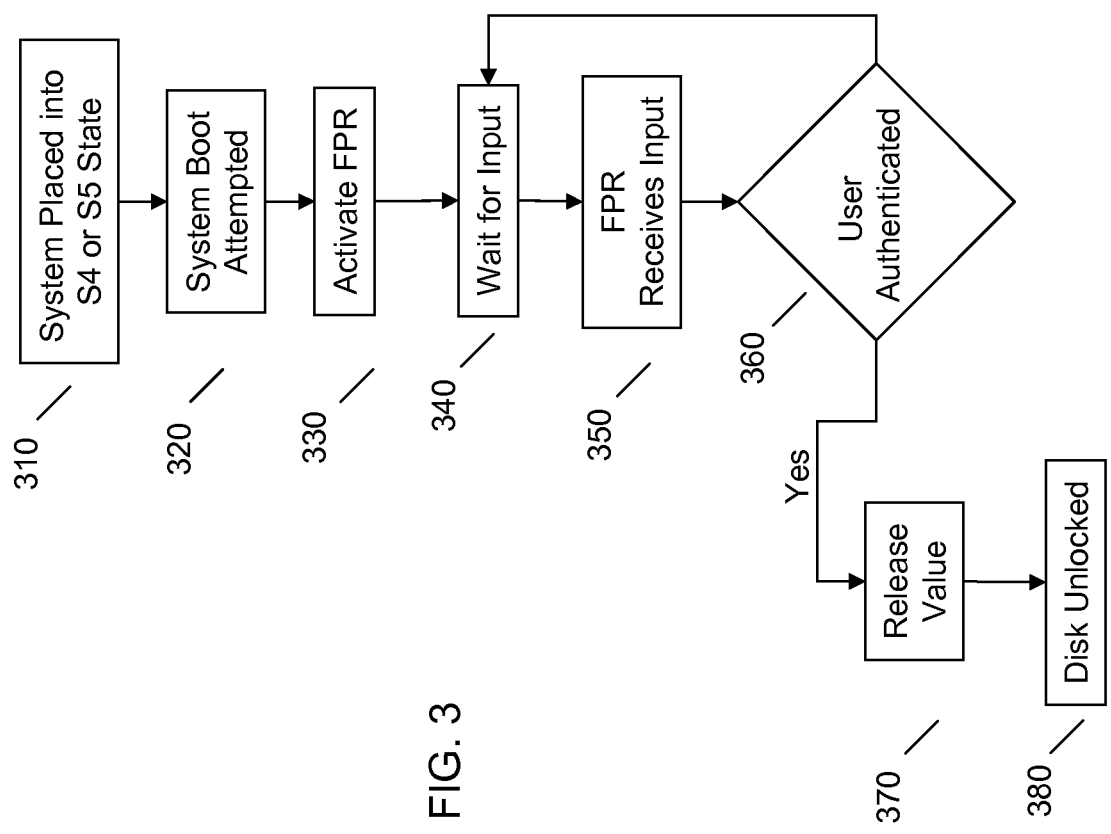
FIG. 3 illustrates an example method for secure re-boot.

Referring to FIG. 3, an example method for authorizing a user at a boot from a power off state is illustrated. When the system 201 enters a power off state 310, such as S4 or S5, the user places the system 201 in a very low power state requiring a re-boot to resume operations. For example, a user places a laptop in a power off state by shutting down or hibernating the laptop. From this power off state, the user can power on the system 201 only with a re-boot, which conventionally requires running the pre-boot environment to unlock the SED drive 203.

In an embodiment, responsive to an attempt to boot 320 the computing system 201 from a power off state, a FPR 202 is activated 330. The activated FPR 202 waits for input 340. Responsive to the FPR 202 receiving input 350, the user is authenticated 360.

The FPR 202 authenticates the user attempting to boot from a power off state. For example, the FPR 202 may be initialized for one or more users and have biometric input (finger slide) associated with one or more user passwords. For example, a first user's finger may be associated with password 1, whereas a second user's finger may be associated with passwords 1, 2 and 3. If the user attempting to authenticate to the FPR 202 provides a finger slide that matches the initialized finger slide, as calculated by the FPR 202, the associated password(s) are released. In similar fashion, the value may be released by the FPR 202.

If authentication fails, the attempt to boot the system 201 fails. For example, at this point the FPR 202 can again wait for input 340. If the user is authenticated, the FPR 202 makes available the value for unlocking the SED 203, such as releasing the value to the BIOS (SMI handler) at 370. Responsive to releasing the value 370, the SED 203 is unlocked 390, which allows the system 201 to boot up (including accessing encrypted contents on SED 203).

The value sent by the FPR 202 may be a simple value, such as an indication that the user has been authenticated. However, the value may be the alternate credential itself, having been stored in the secure memory of the FPR 202 during the initial booting process (for example, by the pre-boot environment code), or may be a value used to derive a credential (or alternate credential) stored somewhere within the computing system.

Having the credential (or a value utilized to derive the credential) be released by the FPR prevents replacing the FPR 202 on the system to allow release of the credential from BIOS. In this regard, the value released may be a value that can be used to calculate (decrypt) a credential (or alternate credential) for unlocking the drive, may be a hash of the value, may be a secure form of the value, or may be an independent value that instructs BIOS that it is safe to release another credential (or alternate credential) for unlocking the drive. Therefore, the value released functions to ensure that the environment in which the SED 203 is unlocked is ensured to be an environment where an authorized user is present.

Referring to FIG. 4A, as a non-limiting example, responsive to a user being authenticated 410A, such as via a FPR 202, the value is released at 420A. A component, such as BIOS, may then utilize the value to decrypt a credential (which may be a clear form of the value itself) 430A for unlocking the SED 203. This allows the decrypted credential to unlock the drive. Encrypting the value is a non-limiting example, and those having ordinary skill in the art will readily appreciate that there are other means of securing an unlock credential. For example, to prevent bus sniffing, the value released by the FPR 202 could be a hash of a value (for example, a hash of the actual (or alternate) credential stored by BIOS). The SMI handler could decrypt and hash a stored, actual (or alternate) credential and compare the hash received from the FPR 202. If these agree or match, then the SED 203 could be unlocked.

Additionally, referring to FIG. 4B, an embodiment provides for secure re-boot from another device, such as a removable device including but not limited to a CD or a memory stick. Responsive to the user being authorized at 410B, the value is released by the FPR 420B. The value allows for unlocking the drive and booting from the removable device at 430B. Again, any of a number of means could be utilized to ensure the value released from the FPR 202 and/or the credential for unlocking the SED 203 is secure.

Embodiments may be implemented in one or more computing devices configured appropriately to execute program instructions consistent with the functionality of the embodiments of the invention as described herein. In this regard, FIG. 1 describes a non-limiting example of such a computing device. While mobile computing systems such as laptop computers have been specifically mentioned as examples herein, embodiments may be implemented using other computing systems, such as desktops, workstations, servers, smartphones, slates, tablets, and the like.

As will be appreciated by one skilled in the art, various aspects may be embodied as a system, method or computer program product. Accordingly, aspects may take the form of an entirely hardware embodiment or an embodiment including software and/or hardware aspects that may all generally be referred to herein as a "circuit," "module" or "system." Furthermore, aspects may take the form of a computer program product embodied in one or more computer readable medium(s) having computer readable program code embodied thereon.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying drawings, it is to be understood that this description is not limiting and that various other changes and modifications may be affected therein by one skilled in the art without departing from the scope or spirit of the disclosure.

What is claimed is:

1. A method comprising:
   in an initial boot process at a computing device, setting up an alternate credential in a pre-boot environment, wherein the pre-boot environment includes master boot record shadowing;
   after the initial boot process, receiving an indication to boot from a power off state at the computing device;
   responsive to authenticating a user at one or more input devices, releasing a value derived from authenticating the user at the one or more input devices;
   responsive to releasing the value, unlocking one or more encrypted drives with the previously established alternate credential; and
   thereafter proceeding to boot from the power off state.

2. The method according to claim 1, wherein the one or more input devices comprise a biometric device.

3. The method according to claim 1, wherein the one or more input devices comprise a fingerprint reader.

4. The method according to claim 1, wherein one or more input devices comprise a smart card reader.

5. The method according to claim 1, wherein the power off state is one of S4 and S5.

6. The method according to claim 1, wherein the one or more encrypted drives comprise one or more self-encrypting drives encrypted with the previously established alternate credential.

7. The method according to claim 1, wherein the value derived from authenticating the user at the one or more input devices is a hash.

8. The method according to claim 7, further comprising:
   comparing a hash of the alternate credential with the hash of the value derived from authenticating the user at the one or more input devices;
   wherein said unlocking occurs responsive to a match between said hashes.

9. The method according to claim 8, wherein the alternate credential is stored in a secure form and subsequently converted into a useable form.

10. A system comprising:
    one or more processors;
    one or more encrypted drives; and
    one or more input devices;
    wherein, responsive to execution of computer program instructions accessible to the one or more processors, the one or more processors are configured to:
    in an initial boot process, set UP an alternate credential in a pre-boot environment, wherein the pre-boot environment includes master boot record shadowing;
    after the initial boot process, receive an indication to boot from a power off state of the system;
    responsive to authenticating a user at one or more input devices, release a value derived from authenticating the user at the one or more input devices;
    responsive to releasing the value, unlock one or more encrypted drives with the previously established alternate credential; and
    thereafter proceed to boot from the power off state.

11. The system according to claim 10, wherein the one or more input devices comprise a biometric device.

12. The system according to claim 10, wherein the one or more input devices comprise a fingerprint reader.

13. The system according to claim 10, wherein the one or more input devices comprise a smart card reader.

14. The system according to claim 10, wherein the power off state is one of S4 and S5.

15. The system according to claim 10, wherein the value derived from authenticating the user at the one or more input devices is a hash.

16. The system according to claim 15, wherein, responsive to execution of computer program instructions accessible to the one or more processors, the one or more processors are further configured to:
    compare a hash of the alternate credential with the hash of the value derived from authenticating the user at the one or more input devices;
    wherein said unlocking occurs responsive to a match between said hashes.

17. The system according to claim 16, wherein the alternate credential is stored in a secure form and subsequently converted into a useable form.

18. A computer program product comprising:
    a computer readable storage medium having computer readable program code embodied therewith, the computer readable program code comprising:
    computer readable program code configured to, in an initial boot process at a computing device, set up an alternate credential in a pre-boot environment, wherein the pre-boot environment includes master boot record shadowing;
    computer readable program code configured to, after the initial boot process, receive an indication to boot from a power off state at a computing device;
    computer readable program code configured to, responsive to authenticating a user at one or more input devices, release a value derived from authenticating the user at the one or more input devices;
    computer readable program code configured to, responsive to releasing the value, unlock one or more encrypted drives with the previously established alternate credential; and
    computer readable program code configured to thereafter proceed to boot from the power off state.

* * * * *